March 6, 1962 W. BRAÜN 3,024,280
PROCESS AND APPARATUS FOR THE PRODUCTION OF UREA
Filed May 14, 1958
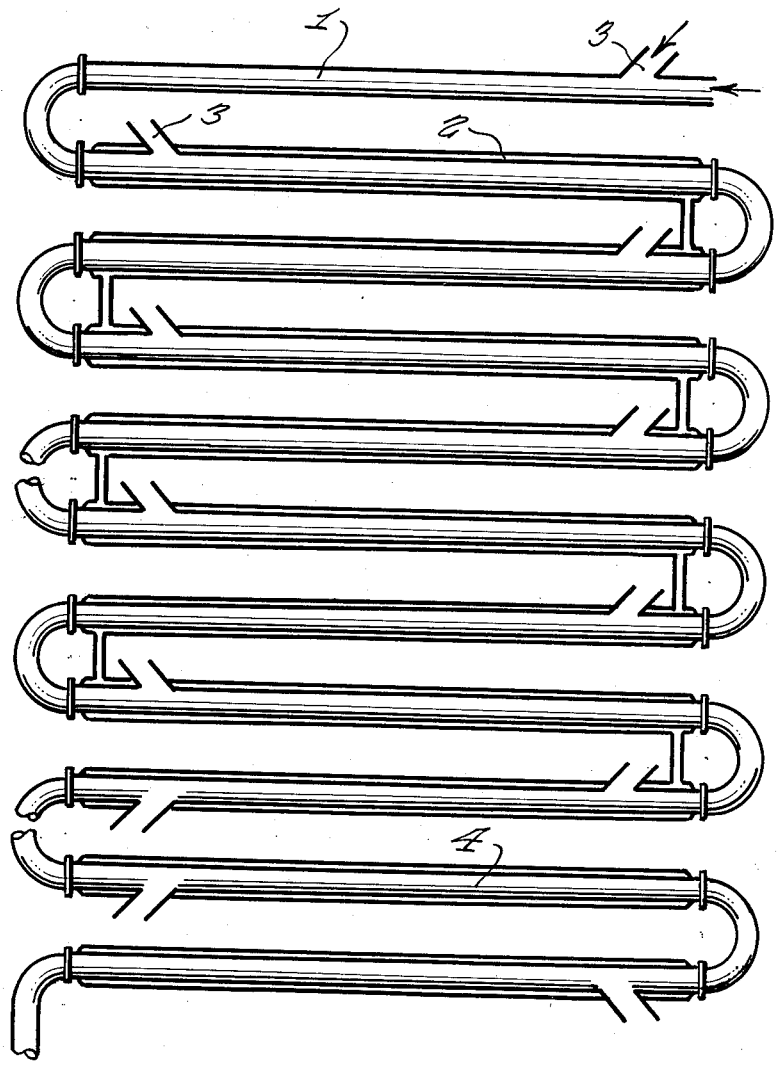
INVENTOR.
WILHELM BRAÜN
BY
Mestern & Kollin
ATTORNEYS

3,024,280
PROCESS AND APPARATUS FOR THE PRODUCTION OF UREA

Wilhelm Braün, Lucerne, Switzerland, assignor to Inventa, A.G., fur Forschung & Patentverwertung, Zurich, Switzerland
Filed May 14, 1958, Ser. No. 735,209
Claims priority, application Switzerland July 25, 1957
2 Claims. (Cl. 260—555)

This invention relates to the continuous production of urea, to an increase in yield thereof, and to an apparatus for carrying out the reaction.

As a rule, urea is produced from carbon dioxide and ammonia at elevated temperatures and pressures. The reaction of ammonia and carbon dioxide to yield urea proceeds in two steps, according to the following Formulae 1 and 2:

(1)    $2NH_3 + CO_2 \rightarrow H_4NOOCHNH_2$
(2)    $H_4NOOCHNH_2 \rightarrow H_2N\text{—}CO\text{—}NH_2 + H_2O$ It is known that only part of the starting materials is converted into urea, the remainder reaching only the carbamate step. The extent of the conversion depends largely upon the pressures and temperatures employed, aside from the proportions of the starting materials.

It is also known that the reaction according to Formula 1 above is highly exothermic and that that according to Formula 2 is endothermic. In the processes used most commonly to date, both reactions take place side by side in the same reaction space, so that, as an average for both these reactions, a rather strongly exothermic state prevails. It is a fact that the temperature in such a reaction space is rather uniform.

This is explained by the turbulence created by the spontaneous reaction according to Formula 1, the carbamate formation. The second reaction, the formation of urea according to Formula 2, proceeds at a considerably slower speed. However, this turbulence not only brings about uniform temperatures in the reactor, but also effects an even distribution of the components of the reaction mixture. In this manner, the undesirable effect is obtained whereby the urea already formed remains in the reactor too long, whereas the starting materials ($NH_3$ and $CO_2$) and the intermediate product, ammoniumcarbamate, do not dwell long enough in the reactor. This favors secondary reactions, especially the formation of biuret, as shown in Formula 3, with an ensuing decrease in yield of urea:

(3)  $2H_2N\text{—}CO\text{—}NH_2 \rightarrow H_2N\text{—}CO\text{—}NH\text{—}CO\text{—}NH_2 + NH_3$ These obvious disadvantages might be overcome by substituting as a reactor a pipe with comparatively small diameter for the customary converter. This has been suggested, e.g., in French Patent 973,011 and in Belgian Patent 522,822. By means of the shape of the pipe, the reactions according to Formulae 1 and 2 are carried out in separate areas, and the turbulence created by the reaction according to Formula 3 which extends over the entire reaction area is thereby rendered impossible.

Not described in either of the above references are means for carrying off the heat created by the reaction according to Formula 1 at the place of heat development and to such an extent that local overheating and also corrosion of the reaction vessel are avoided. The method described in the two references is not easily carried out in actual practice.

It has now been found that the above-described disadvantages can be overcome when one of the reaction components, e.g., $NH_3$, is conducted continuously through a reaction pipe, while the corresponding quantity of the other reactant, e.g., $CO_2$, is not added all at once, but is added stepwise at different points of the reaction pipe, the reaction otherwise being carried out as usual, i.e., at elevated temperatures and under elevated pressures. It is also equally effective to feed the carbon dioxide continuously through the pipe and to add the ammonia stepwise.

The production of urea according to the present invention will now be explained further with reference to the attached drawing.

In the drawing,

Pipes 1 are made of stainless steel and have an inside diameter of approximately 9.5 cm. A number of these pipes are connected to form a reactor and are partly covered by jacketing pipes 2 having a diameter of 15 cm. Through the inner pipe, 1225 kg./h. ammonia are conducted which has an inlet temperature of −30° C. up to +40° C. The total length of the reaction pipe is approximately 140 m. in parallel sections of 17×8.3 m. At the start of the first section, an inlet nipple 3 is disposed, through which approximately 40 percent of the total required $CO_2$ is admitted. In this first section, the dissipation of the heat does not meet with any particular difficulties because the ammonia flowing through the pipe has a cooling action. In each of the 16 sections following the first, 3¾ percent each of $CO_2$ are added through additional nipples 3, whereby the heat is dissipated solely by the water flowing through the jacket. Afterward, the reaction mixture flows through the heated sections 4 of the reactor, in which, however, no more $CO_2$ is added, and is heated to a temperature of 160–240° C. These last sections can also be replaced by conventional high-pressure converters, since no reaction according to Formula 1 occurs and, therefore, no turbulence can be created.

It has been found that, according to the present invention, a given amount of urea can be manufactured in an apparatus with comparatively smaller volume than had been used heretofore, and that the yield improves considerably, i.e. by 10 to 15 percent.

As a further embodiment of the present invention, it has been found advantageous to keep the diameter of the reaction pipe smaller in the urea zone than in the carbamate zone in consideration of the volume concentration effected by the reaction of $CO_2$ and $NH_3$ to carbamate and the ensuing conversion to urea and water.

As construction material for the reaction pipe and for the alternately usable converter for the second step of the reaction, stainless steel is best suited. The corrosion effected by the presence of reducing substances can be lessened in a known manner, e.g., by addition of oxygen or oxygen-containing gases in amounts of 0.01 to 0.2 percent by weight $O_2$, calculated on the total quantity of $CO_2$, to the starting materials.

What I claim is:

1. A process for the continuous production of urea by reaction of substantially stoichiometric amounts of two components consisting of carbon dioxide and ammonia at pressures of 100–300 atmospheres and at temperatures of 160–240° C. in a reactor, which consists of continuously feeding one of said components into said reactor at an entrance temperature of −30 to 40° C., adding thereto a portion of approximately 40 percent of the stoichiometric amount of the other component, adding the remainder in small quantities of equal size and in different zones of said reactor, and continuing the reaction at said temperatures and pressures.

2. A process for the continuous production of urea by reaction of substantially stoichiometric amounts of two components consisting of carbon dioxide and ammonia at pressures of 100–300 atmospheres and at temperatures of 160–240° C. in a reactor, which consists of feeding said ammonia continuously into said reactor at an entrance temperature of −30 to 40° C., adding thereto approximately 40 percent of the stoichiometric amount of said carbon dioxide, adding the remaining carbon dioxide in equal portions of approximately 3¾ percent of the total and in different zones of said reactor, and continuing the reaction at said temperatures and pressures.

References Cited in the file of this patent

UNITED STATES PATENTS 2,575,855   Stengel et al. _____ Nov. 20, 1951

FOREIGN PATENTS 522,822   Belgium _____ Oct. 15, 1953
973,011   France _____ Feb. 6, 1951

OTHER REFERENCES

Tonn: Chemical Engineering, pages 186–190 (October 1955).